(12) United States Patent
Kelly et al.

(10) Patent No.: US 11,193,427 B2
(45) Date of Patent: Dec. 7, 2021

(54) PASSIVE ACTIVE POPPET-TYPE BLEED VALVES

(71) Applicant: Hamilton Sundstrand Corporation, Charlotte, NC (US)

(72) Inventors: Myles R. Kelly, Willimantic, CT (US); James S. Elder, Jr., South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 472 days.

(21) Appl. No.: 15/965,502

(22) Filed: Apr. 27, 2018

(65) Prior Publication Data

US 2019/0331030 A1 Oct. 31, 2019

(51) Int. Cl.
*F02C 9/18* (2006.01)
*F16K 15/02* (2006.01)

(52) U.S. Cl.
CPC .............. *F02C 9/18* (2013.01); *F16K 15/026* (2013.01); *F05D 2260/85* (2013.01); *F05D 2270/312* (2013.01)

(58) Field of Classification Search
CPC .. F02C 9/18; F02C 3/04; F01D 17/145; F02K 3/06; F02K 1/386; F02K 3/075
See application file for complete search history.

(56) References Cited

U.S. PATENT DOCUMENTS

| | | | |
|---|---|---|---|
| 3,362,424 A | 1/1968 | Smith | |
| 3,638,905 A | 2/1972 | Ferris | |
| 3,949,964 A | 4/1976 | Freeman | |
| 8,814,498 B2 | 8/2014 | Goodman et al. | |
| 9,752,513 B2 | 9/2017 | Fong et al. | |
| 10,273,884 B2 * | 4/2019 | Ribarov | F01D 17/145 |
| 10,859,178 B2 * | 12/2020 | Kelly | F02C 6/08 |
| 2010/0083667 A1 * | 4/2010 | Franconi | G05D 7/014 60/795 |
| 2011/0175009 A1 * | 7/2011 | Kristoffersen | F16K 15/063 251/321 |
| 2016/0230904 A1 | 8/2016 | Zarrabi et al. | |
| 2017/0022986 A1 | 1/2017 | McIntyre et al. | |
| 2017/0356348 A1 | 12/2017 | Ribarov et al. | |

OTHER PUBLICATIONS

Extended European Search Report issued in corresponding European Patent Application No. EP 19171598.6, dated Sep. 19, 2019.

* cited by examiner

*Primary Examiner* — Craig Kim
(74) *Attorney, Agent, or Firm* — Locke Lord LLP; Joshua L. Jones; Scott D. Wofsy (57) ABSTRACT

A bleed valve for an air plenum includes a valve body having a poppet seat, a poppet supported by the valve body and movable relative to the poppet seat, and piston slideable relative to the poppet and movable relative to the poppet between an extended position and a retracted position. Gas turbine engines and methods of bleeding fluid from gas turbine engines are also described.

12 Claims, 6 Drawing Sheets

PASSIVE ACTIVE POPPET-TYPE BLEED VALVES

BACKGROUND OF THE INVENTION

1. Field of the Invention

The present disclosure relates to gas turbine engines, and more particularly to poppet type bleed valves for gas turbine engines having both active and passive bleed valve functionality.

2. Description of Related Art

Gas turbine engines commonly include a compressor section, a combustion section, and a turbine section. The compressor section ingests fluid from the ambient environment, compresses the fluid and provides the compressed fluid to the combustion section. Fuel is introduced into the compressed fluid in the combustion section to produce high pressure combustion products, which the combustion section provides to the turbine section. The turbine section expands the combustion products to extract work from the expanding combustion products, the extracted typically being provided to the compression section for compressing the ingested fluid.

During engine starting it can sometimes be advantageous to reduce the input work otherwise necessary to compress fluid ingested by the compressor section, typically by venting the compressor section to the external environment. Venting it typically accomplished using bleed valves, which leave the compressor section fluidly open the external environment until fluid moving through the compressor section reaches a suitable pressure. Closure can be passive, the bleed valve closing in response to fluid pressure acting upon of the bleed valve. Closure can be active, the bleed valve being closed by fluid pressure sensed within the compressor section.

Such conventional methods and systems have generally been considered satisfactory for their intended purpose. However, there is still a need in the art for improved bleed valves, gas turbine engines, and methods of bleeding working fluid from gas turbine engines. The present disclosure provides a solution for this need.

SUMMARY OF THE INVENTION

A bleed valve for an air plenum includes a valve body having a poppet seat, a poppet supported by the valve body and movable relative to the poppet seat, and piston slidably relative to the poppet and movable relative to the poppet between an extended position and a retracted position.

In certain embodiments a biasing spring can be arranged between the piston and the valve body. The biasing spring can be arranged to exert a biasing force on the piston when ambient pressure is present within the valve body. The biasing spring can be arranged to exert substantially no biasing force on the piston when pressure greater than ambient is present within the valve body. A valve body end of the biasing spring can be fixed relative to the valve to the valve body. A piston end of the biasing spring can be fixed relative to the piston.

In accordance with certain embodiments a poppet spring can be arranged between the poppet and the piston. The poppet spring can have a piston end fixed relative to the piston and movable relative to the valve body. The poppet spring can have a poppet end fixed relative to the poppet and movable relative to the valve body.

It is contemplated that the valve body can bound a muscle chamber defined between the valve body and the piston, a compressible chamber defined between the piston and a piston face of the poppet, and a plenum chamber defined between a plenum face of the piston and the poppet. A solenoid valve can be connected to the bleed valve to selectively apply ambient and muscle pressure to the valve body. A muscle pressure source can be in selective fluid communication with the bleed valve to apply muscle pressure to the valve body.

It is also contemplated that, in accordance with certain embodiments, the poppet can have a fully closed position wherein the poppet sealably abuts the poppet seat with the piston in retracted position. The poppet can have a fully open position wherein the poppet is spaced apart from the poppet seat with the piston in the extended position. The poppet can have an intermediate position, disposed between the fully open position and the fully closed position, wherein the poppet is spaced apart from the poppet seat with the piston in the retracted position.

A gas turbine engine includes a compressor section. The gas turbine engine also includes a plenum that is in fluid communication with the compressor section. A bleed valve as described above is in communication with the plenum. In certain embodiments the gas turbine can include a solenoid valve connected to the bleed valve. A muscle pressure source can be in selective fluid communication with the bleed valve through the solenoid valve to selectively apply ambient and muscle pressure. In accordance with certain embodiments a biasing spring arranged between the piston and the valve body and a poppet spring arranged between the poppet and the piston.

A method of bleeding a gas turbine engine plenum includes, at a bleed valve as described above, displacing the piston relative to the poppet between an extended position and a retracted position. In certain embodiments the method can include displacing the poppet relative to the poppet seat to a discrete intermediate position, disposed between fully open and fully closed positions, coincident with displacing the piston between the extended and retracted positions.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
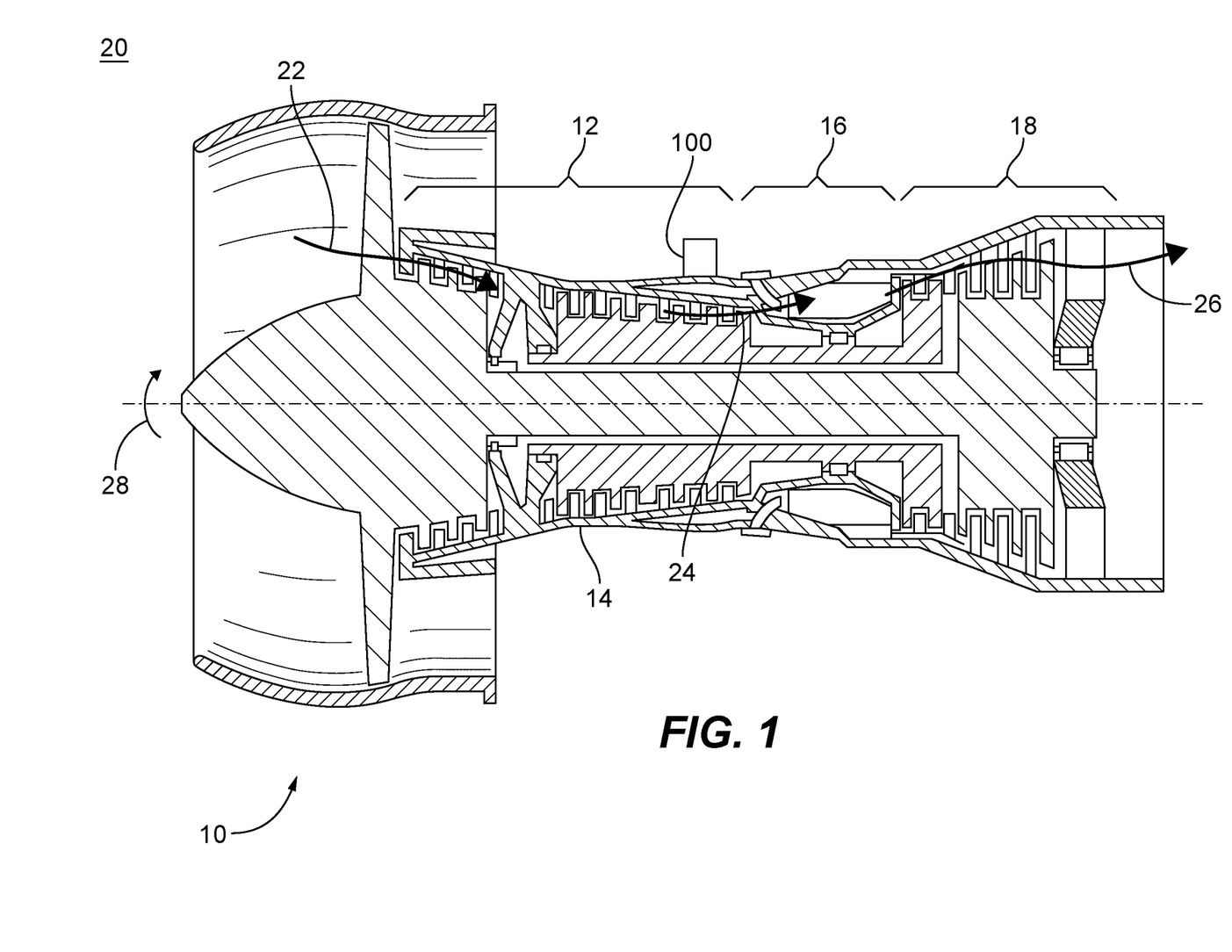
FIG. 1 is a cross-sectional view of an exemplary embodiment of a gas turbine engine constructed in accordance with the present disclosure, showing a bleed valve with a poppet.

Reference will now be made to the drawings wherein like reference numerals identify similar structural features or aspects of the subject disclosure. For purposes of explanation and illustration, and not limitation, a partial view of an exemplary embodiment of a bleed valve for a plenum in accordance with the disclosure is shown in FIG. 1 and is designated generally by reference character 100. Other embodiments of bleed valves, gas turbine engines, and methods of bleeding fluid from plenums in accordance with the disclosure, or aspects thereof, are provided in FIGS. 2-6, as will be described. The systems and methods described herein can be used bleeding fluid from gas turbine engines, such as from aircraft engines, though the present disclosure is not limited to aircraft engines in general.

Referring to FIG. 1, a gas turbine engine 10 is shown. Gas turbine engine 10 includes a compressor section 12 with a case 14, a combustion section 16, and a turbine section 18. Compressor section 12 is disposed in fluid communication with external environment 20 and is arranged to compress fluid 22 ingested from external environment 20. Once compressed fluid 22 is communicated to combustion section 16 as a compressed fluid 24.

Combustion section 16 is disposed in fluid communication with compressor section 12, is arranged to receive therefrom compressed fluid 24, and generates high pressure combustion products 26 using compressed fluid 24 and fuel also provided to combustion section 16. High pressure combustion products 26 are provided by combustion section 16 to turbine section 18.

Turbine section 18 is disposed in fluid communication with combustion section 16 and is arranged to receive therefrom high pressure combustion products 26. The high pressure combustion products 26 are expanded by as they flow through turbine section 18, turbine section 18 extracting work 28 from combustion products 26 during expansion. Work 28 is provided to compressor section 12 to provide the input power necessary to compress fluid 22 to generate compressed fluid 24, the amount of work corresponding the amount of fluid and extent of compression required for the operating state of gas turbine engine 10. Bleed valve 100 is connected to case 14 for reducing amount of work 28 provided to compressor section 12 according to the operating regime of gas turbine engine 10.

Figure 2:
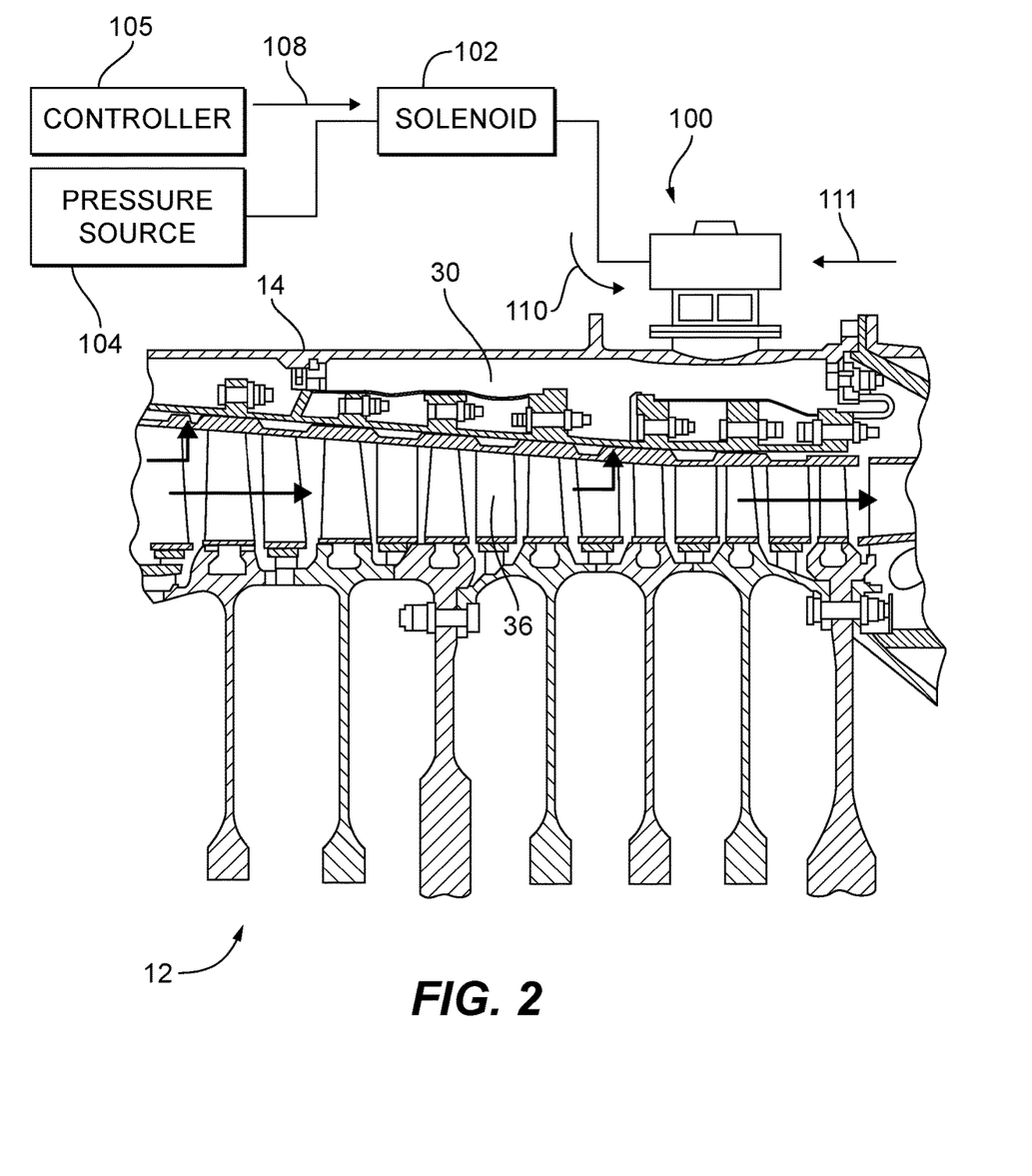
FIG. 2 is a cross-sectional view of a portion of the gas turbine of FIG. 1, showing the bleed valve connected to the gas turbine engine compressor section by a plenum.

With reference to FIG. 2, compressor section 12 and bleed valve 100 is shown. Gas turbine engine 10 (shown in FIG. 1) includes a plenum 30. Plenum 30 is in fluid communication with compressor section 12. Bleed valve 100 is in communication with plenum 30. A solenoid valve 102 is connected to bleed valve 100. Solenoid valve 102 is in fluid communication with a muscle pressure source 104. A controller 105 for a bleed air system is operably connected to solenoid valve 102 and is arranged to apply an open signal 108 to solenoid valve 102.

When open signal 108 is applied to solenoid valve 102 solenoid valve 102 opens, and muscle pressure 110 is applied to bleed valve 100. When open signal 108 is not applied to solenoid valve 102 solenoid valve 102 closes and ambient pressure 111, which is lower than the pressure applied by muscle pressure source 104, is applied to bleed valve 100. In the illustrated exemplary embodiment gas turbine engine 10 includes a single bleed valve 100. As will be appreciated by those of skill in the art in view of the present disclosure, gas turbine engine 10 can include more than one bleed valve, as suitable for an intended application.

Figure 3:
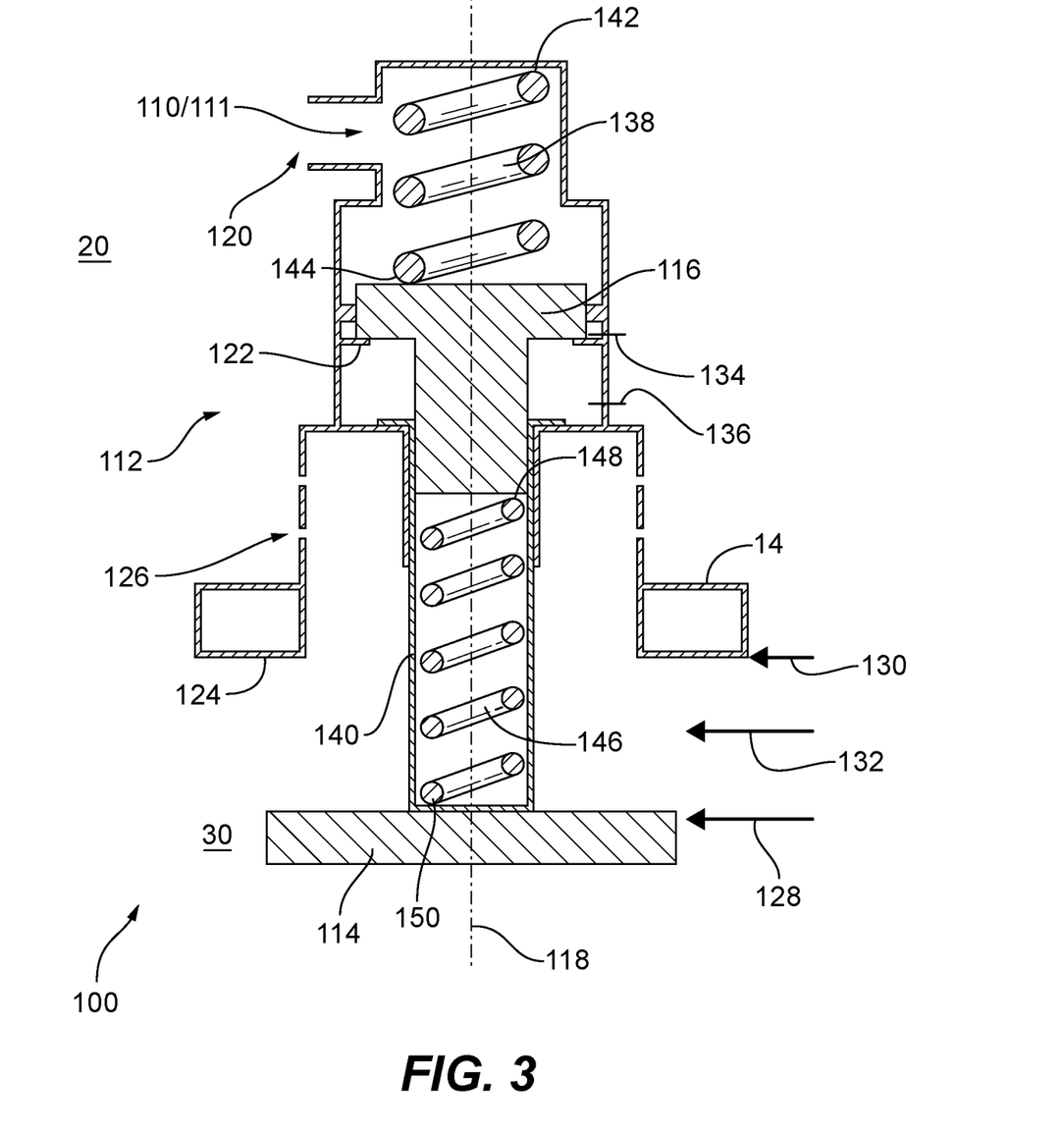
FIG. 3 is a schematic view of the bleed valve of FIG. 1, showing a piston slideable relative to the poppet and movable relative to the poppet.

With reference to FIG. 3, bleed valve 100 is shown. Bleed valve 100 includes a valve body 112 a poppet 114, and a piston 116. Valve body 112 defines an axis 118 and has a pressure port 120, a piston stop 122, and a poppet seat 124. Pressure port 120 is in fluid communication with muscle pressure source 110 (shown in FIG. 2). Piston stop 122 is arranged within the interior of valve body 112 and extends about axis 118. Poppet seat 124 is arranged on a side of valve body 112 opposite pressure port 120. A vent 126 extends through valve body 112 at a location along axis 118 between poppet seat 124 and piston stop 122.

Valve body 112 defines within its interior a muscle chamber 113, a compressible chamber 115, and a plenum chamber 117. Muscle chamber 113 is defined between valve body 112 and piston 116. Compressible chamber 115 is defined between piston stop 122 and poppet 114. Plenum chamber 117 is defined between a piston face of poppet 114 and compressible chamber 115. Solenoid 102 is connected to bleed valve 100 and more particularly to muscle chamber 115 to selectively apply ambient pressure 111 or muscle pressure 110 (which is greater than ambient pressure 111) to valve body 112 via muscle chamber 115. Muscle pressure source 114 source is in selective fluid communication with bleed valve 100 through solenoid 102 to selectively apply muscle pressure 110 to valve body 112 at muscle chamber 115.

Poppet 114 is arranged along axis 118 and is movable relative poppet seat 124. In this respect poppet 114 is movable along axis 118 between a fully open position 128 (shown in FIG. 4), wherein plenum 30 is in fluid communication with external environment 20 through vent 126, and a closed position 130, wherein poppet 114 sealably abuts poppet seat 124 such that poppet 114 fluidly separates plenum 30 from external environment 20. An intermediate position 132 is also defined between fully open position 128 and closed position 130, bleed valve 100 fluidly coupling plenum 30 with external environment 20 when in intermediate position 132.

Piston 116 is slideable relative to poppet 114, e.g., slidably disposed at least partially within poppet 114, and is movable relative to poppet 114 between an extended position 134 and a retracted position 136. More particularly, poppet 114 arranged within valve body 112 and is arranged between piston stop 122 and a biasing spring 138. In the extended position 134 piston 116 is spaced apart from a stem 140 of poppet 114. In the retracted position 136 piston 116 abuts poppet stem 140 of poppet 114. A sealing member 152 extends about piston 116 and between piston 116 and an interior of valve body 112.

Biasing spring 138 is arranged along axis 118 and has a valve body end 142 and a piston end 144. Valve body end 142 is fixed relative to valve body 112. Piston end 144 is arranged axially opposite valve body end 142 and is fixed relative to piston 116. It is contemplated that biasing spring 138 be arranged between piston 116 and valve body 112 and configured to exert a biasing force on piston 116 when ambient pressure is present within valve body 112 that urges piston 116 in a direction along axis 106 towards poppet 114. It is also contemplated that biasing spring 138 be arranged to exert substantially no biasing force on piston 116 when pressure within valve body 112 greater than ambient, e.g., muscle pressure, is present within valve body 112. For example, the free length of biasing spring 138 can be selected such that the free length of biasing spring 138 is less than the distance between the location at which valve body end 142 is connected to valve body 112 and piston 116 abuts piston stop 122.

A poppet spring 146 is arranged between piston 116 and poppet 114. Poppet spring 146 has a piston end 148 and an opposite poppet end 150. Poppet end 150 is fixed relative to poppet 114 and piston end 148 is fixed relative to piston end 148. The available stroke to passive action, i.e., full compression of poppet spring 146, plus the active action of biasing spring 138, i.e., full compression of biasing spring 138 when pressure is removed from valve body 112, is greater than the stroke of poppet 114 between the fully open position and the fully closed position.

It is contemplated that poppet spring 146 be arranged such that, when piston 116 is in the retracted position 136, poppet spring 146 exert substantially no force on piston 116. It is also contemplated that, when piston 116 is in the extended position 134, poppet spring 146 exert a poppet spring force that urges piston 116 in a direction along axis 118 towards poppet 114. In the illustrated exemplary embodiment poppet spring 146 is arranged along axis 118 within poppet stem 140, which provides a race for a piston guide extending from piston 116 and received within poppet stem 140. As will appreciated by those of skill in the art in view of the present disclosure, other arrangements of poppet spring 146 are possible beyond that of the illustrated embodiment within the scope of the present disclosure.

Figure 4:
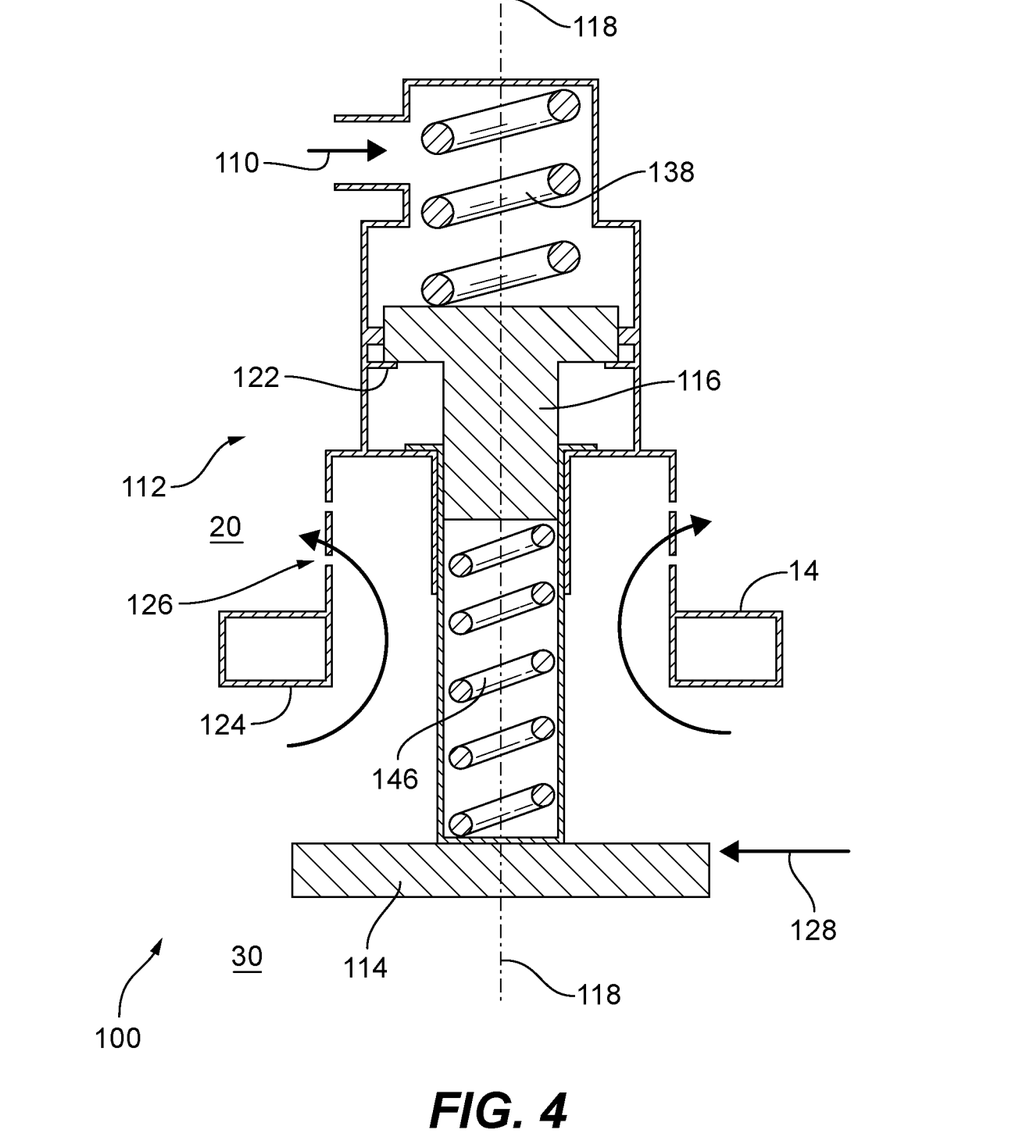
FIG. 4 is a schematic view of the bleed valve of FIG. 1, showing pressure within the gas turbine engine compressor section and muscle pressure applied to the bleed valve retaining the poppet in a fully open position and the piston extended away from the poppet.
Figure 5:
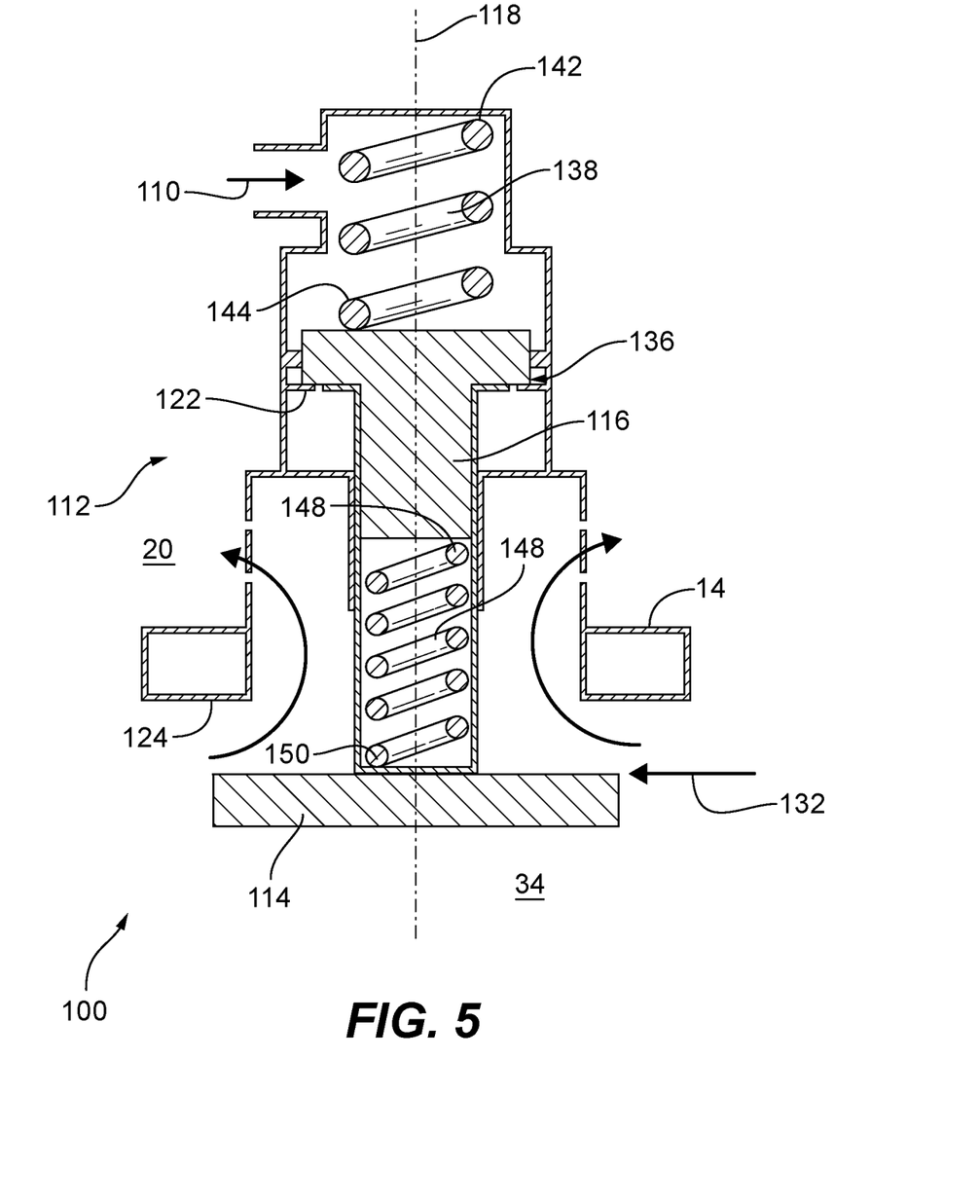
FIG. 5 is a schematic view of the bleed valve of FIG. 1, showing pressure within the gas turbine engine compressor section and muscle pressure applied to the bleed valve retaining the poppet in a discrete intermediate position and the piston retracted into the poppet.
Figure 6:
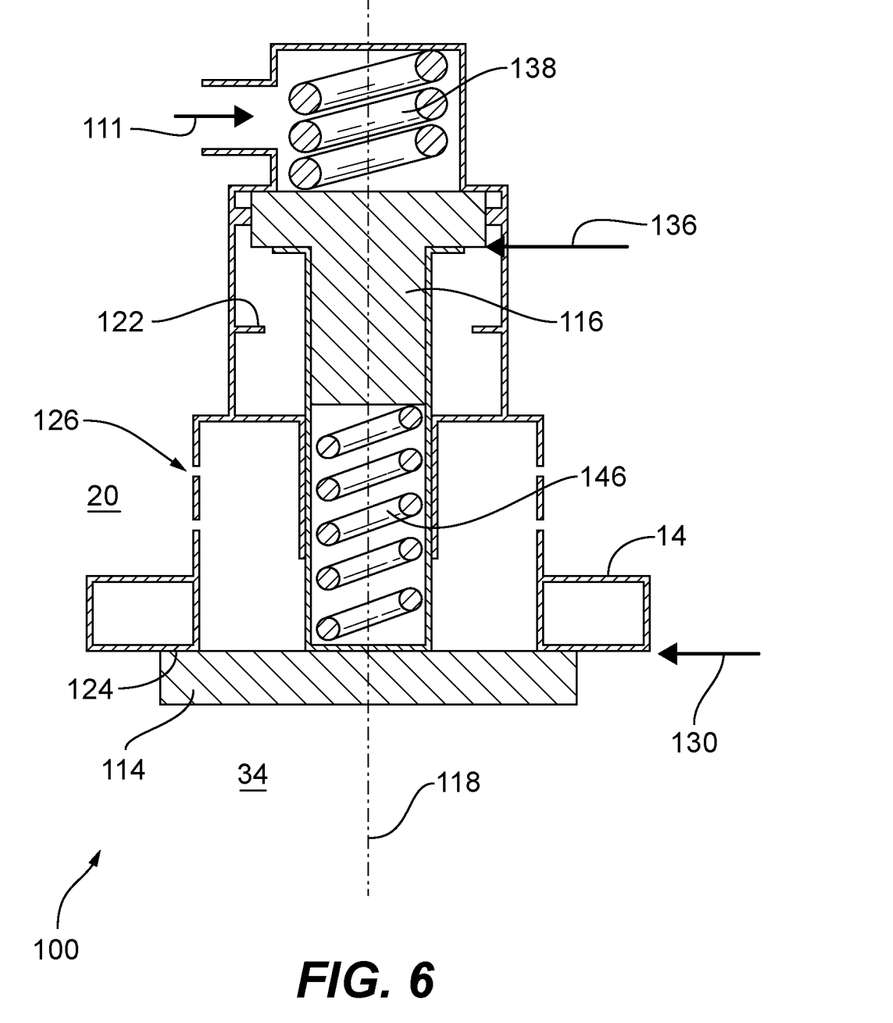
FIG. 6 is a schematic view of the bleed valve of FIG. 1, showing pressure within the gas turbine engine compressor section and ambient pressure applied to the bleed valve retaining the poppet in a closed position and the piston retracted into the poppet.

With reference to FIGS. 4-6, bleed valve 100 is shown fully open position 128, discrete intermediate position 132, and closed position 130, respectively. Referring to FIG. 4, position of poppet 114 relative to valve body 112 along axis 118 is determined by the axial distance that poppet 114 must move along axis 106 responsive to pressure within plenum 30 to offset force exerted by poppet spring 146 on poppet 114. Pressure within plenum 30 in turn varies according to the operating regime of gas turbine engine 10 (shown in FIG. 1), pressure within plenum 30 being relative low during engine starting, and pressure within plenum 30 being relatively high during steady state operation. The force exerted by poppet spring 146 on poppet 114 varies according to whether piston 116 is retracted from poppet 114 or extended from poppet 114.

When muscle pressure 110 present within valve body 112 piston 116 displaces within valve body 112 along axis 118 such that piston 116 abuts piston stop 122. This allows biasing spring 138 to relax and limits the position of poppet 114 to an axial stroke extending between fully open position 128 and discrete intermediate position 132. When pressure within plenum 30 is relatively low, such as during engine starting, poppet spring 146 exerts poppet spring force sufficient to drive poppet 114 to fully open position 128 (shown in FIG. 4).

As engine starting progresses pressure within plenum 30 increases. As pressure within plenum 30 increases the plenum pressure progressively drives poppet 114 to discrete intermediate position 132 (shown in FIG. 5) from fully open position 128. While both fully open position 128 and discrete intermediate position 132 allow fluid communication between plenum 30 and external environment 20 through bleed valve 100, the open area defined between poppet 114 and poppet seat 124 in discrete intermediate position 132 is smaller than that of fully open 128. The reduction in open is area is selected to provide proper bleed flow through bleed valve 100 while retaining acceptable nacelle temperature during engine starting. It is contemplated that muscle pressure 110 be selected such that piston 116 remain in abutment with piston stop 122 throughout the stroke of poppet 114 between fully open position 128 and discrete intermediate position 132, poppet 114 and piston 116 compressing poppet spring 146 between one another.

Once gas turbine engine 10 (shown in FIG. 1) reaches the point where pressure within plenum 30 allowed to cease the bleeding muscle pressure 110 is removed from valve body 112. Removal of muscle pressure 110 from valve body 112 applies ambient pressure 154 to bleed valve 100. Ambient pressure 154 reduces the force exerted against piston 116 and compressing poppet spring 146, allowing force exerted by compressed poppet spring 146 to urge piston 116 against biasing spring 138, compressing biasing spring 138. It is contemplated that compression of biasing spring 138 continue throughout the stroke of poppet 114 between discrete intermediate position 132 and closed position 130, during which piston 116 strokes between extended position 134 and retracted position 136.

The methods and systems of the present disclosure, as described above and shown in the drawings, provide for bleed valves with superior properties including the functionality of both passive bleed valves and active bleed valves in a single bleed valve. In certain embodiments bleed valves described herein can have three discrete positions, i.e., a fully open position, a closed position, and an intermediate position. In accordance with certain embodiments the functionality of both active and passive bleed valves can be provided with a solenoid, simplifying the arrangement of bleed systems employing the bleed valve compared to bleed systems employing servo actuators, potentially reducing the associated cost and complexity and/or improving the reliability of the bleed system. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A bleed valve for an air plenum, comprising:
a valve body having a poppet seat;
a poppet supported by the valve body and movable relative to the poppet seat; and
a piston entirely positioned between a biasing spring and a poppet spring, and slideable relative to the poppet and movable relative to the poppet between an extended position and a retracted position, wherein the biasing spring is arranged between the piston and the valve body, wherein the biasing spring has a valve body end and a piston end, the valve body end fixed relative to the valve to the valve body, the piston end fixed relative to the piston, wherein the poppet spring is arranged between the poppet and the piston, wherein the poppet spring has a piston end, the piston end fixed relative to the piston and movable relative to the valve body.

2. The bleed valve as recited in claim 1, wherein the biasing spring is arranged to exert a biasing force on the piston when ambient pressure is present within the valve body.

3. The bleed valve as recited in claim 1, wherein the biasing spring is arranged to exert substantially no biasing force on the piston when pressure greater than ambient is present within the valve body.

4. The bleed valve as recited in claim 1, wherein the poppet spring has a poppet end, the poppet end fixed relative to the poppet and movable relative to the valve body.

5. The bleed valve as recited in claim 1, wherein the valve body bounds a muscle chamber, defined between the valve body and the piston, a compressible chamber, defined between the piston and a piston face of the poppet, and a plenum chamber defined between a plenum face of the piston and the poppet.

6. The bleed valve as recited in claim 1, further comprising a solenoid valve connected to the bleed valve to selectively apply ambient and muscle pressure to the valve body.

7. The bleed valve as recited in claim 1, further comprising a muscle pressure source in selective fluid communication with the bleed valve to apply muscle pressure to the valve body.

8. The bleed valve as recited in claim 1, wherein the poppet has (a) a fully closed position, wherein the poppet sealably abuts the poppet seat with the piston in retracted position, (b) a fully open position, wherein the poppet is spaced apart from the poppet seat with the piston in the extended position, and (c) an intermediate position disposed between the fully open position and the fully closed position, wherein the poppet is spaced apart from the poppet seat with the piston in the retracted position.

9. A gas turbine engine, comprising:
   a compressor section;
   a plenum in fluid communication with the compressor section; and
   a bleed valve as recited in claim 1 in communication with the plenum.

10. The gas turbine engine as recited in claim 9, further comprising a solenoid valve connected to the bleed valve and a muscle pressure source in selective fluid communication with the bleed valve through the solenoid valve to selectively apply ambient and muscle pressure.

11. The gas turbine engine as recited in claim 8, further comprising a biasing spring arranged between the piston and the valve body, and a poppet spring arranged between the poppet and the piston.

12. A method of bleeding a gas turbine engine plenum, comprising:
   at a bleed valve having a poppet seat, a poppet supported by the valve body and movable relative to the poppet seat, and a piston slidably disposed within the poppet and movable relative to the poppet,
   displacing the piston relative to the poppet between an extended position and a retracted position, wherein the piston is located axially between a first spring and a second spring; and
   displacing the poppet relative to the poppet seat to a discrete intermediate position, disposed between fully open and fully closed positions, coincident with displacing the piston between the extended and retracted positions.

\* \* \* \* \*